United States Patent [19]

Hayashi et al.

[11] Patent Number: 4,689,779
[45] Date of Patent: Aug. 25, 1987

[54] TRACKING CONTROL SYSTEM FOR OPTICAL RECORD DISC INFORMATION REPRODUCING APPARATUS

[75] Inventors: Yasuhiro Hayashi; Satoru Maeda; Tadashi Kojima, all of Yokohama, Japan

[73] Assignee: Kabushiki Kaisha Toshiba, Kawasaki, Japan

[21] Appl. No.: 810,254

[22] Filed: Dec. 18, 1985

[30] Foreign Application Priority Data

Dec. 19, 1984 [JP] Japan .................. 59-267715
Dec. 19, 1984 [JP] Japan .................. 59-267716
Dec. 19, 1984 [JP] Japan .................. 59-267717

[51] Int. Cl.⁴ .............................. G11B 7/095
[52] U.S. Cl. ............................ 369/44; 369/54; 369/58; 369/46
[58] Field of Search ............. 369/44, 45, 46, 54, 369/58; 358/342

[56] References Cited

U.S. PATENT DOCUMENTS

| | | |
|---|---|---|
| 4,190,859 | 2/1980 | Kinjo . |
| 4,406,000 | 9/1983 | Shoji et al. ............... 369/44 |
| 4,475,182 | 10/1984 | Hosaka ...................... 369/45 |
| 4,580,255 | 4/1986 | Inoue et al. ............... 369/44 |
| 4,587,644 | 5/1986 | Fujiie ....................... 369/44 |
| 4,611,317 | 9/1986 | Takeuchi et al. .......... 369/45 |

FOREIGN PATENT DOCUMENTS 2514103 12/1975 Fed. Rep. of Germany .
3130717 8/1982 Fed. Rep. of Germany .
3239822 5/1983 Fed. Rep. of Germany .

Primary Examiner—Donald McElheny, Jr.
Attorney, Agent, or Firm—Oblon, Fisher, Spivak, McClelland & Maier

[57] ABSTRACT

A tracking control system for an optical disc information reproducing apparatus in which information stored in an optical disc as a series of recesses or pits arranged in concentric tracks or in a single spiral track is read out during rotation of the optical-disc by a scanning spot of a light beam, the system comprising a light source for generating the light beam used for scanning the track, means for applying the scanning spot of the light beam to a selected track location, a transducer for converting an optical signal detected by the scanning spot into an electric signal bearing a tracking error information, means for controlling the scanning spot applying means in response to the tracking error information signal, thereby causing the scanning spot to scan the selected track location accurately, means for transferring the tracking error information signal to the controlling means, a transfer characteristics of the transferring means being variable, means for limiting a slew rate of the tracking error information signal, means for subtracting an output of the slew rate limiting means from the tracking error information signal, and means for lowering the transfer characteristics of the controlling means in response to an output of the subtracting means, thereby causing the controlling means being irresponsive to the tracking error information signal.

2 Claims, 5 Drawing Figures

TRACKING CONTROL SYSTEM FOR OPTICAL RECORD DISC INFORMATION REPRODUCING APPARATUS

FIELD OF THE INVENTION

The present invention relates generally to tracking apparatus and related methods for use in recorvering information from an optical record disc, and more particularly, to tracking apparatus of a type that align a beam of light relative to a selected one of a plurality of parallel recording tracks on an optical record disc.

BACKGROUND OF THE INVENTION

In an optical record disc of the type presently used with a DAD (Digital Audio Disc) player or a video disc player, audio or video information is recorded in optically coded form as a series of recesses or pits formed in the information carrying face of the optical record disc and arranged in either a single spiral track or a plurality of concentric tracks about the center axis of the optical record disc. The audio or video information thus recorded is reproduced by optically scanning the individual recesses or pits along the spiral track or the concentric tracks by means of a convergent spot of laser light beam developed from a laser light beam which is utilized to detect the lengths and spacings between the scanned recesses or pits. During reproduction, the optical record disc is usually rotated about the center axis thereof at a constant linear verocity (CLV) or a constant angular verocity (CAV), and the convergent spot of the laser light beam is displaced radially relative to the optical record disc by a tracking device or a pick-up unit which is a part of the DAD or video disc player. The laser beam is directed to a selected track location and reflected by the information carrying face of the otical record disc or is passed through the optical record disc. The beam of light thus reflected by or passed through the optical-disc is then converted into an electric signal by means of a photoelectric transducer mounted on the pick-up unit so as to facilitate further conversion into an audio or video signal.

In order to reproduce the information recorded on the optical record disc, the convergent spot of the laser light beam must be precisely applied to the selected track location on the optical record disc. To this end, it is known to employ a method in optical record disc information reproducing apparatus wherein light beams, exclusively used for scanning, are generated separately from the light beam used for reproducing the audio or video information signal, with a photoelectric transducer being used for detecting the scanning light beam and effect scanning control. Another method employed involves extracting the audio or video information signal and the scanning signal all with a single light beam.

According to the methods, the light beam for the tracking servo is reflected by the optical record disc, then introduced into a photoelectric transducer. The light beam thus reflected is converted into a tracking error information signal. The tracking error information signal thus detected is introduced into a tracking actuator for driving an objective lens mounted on the pick-up unit radial relative the optical record disc so as to direct the convergent spot to the selected track location accurately. A tracking actuator comprises a tracking servo for the convergent spot of the laser light beam.

Generally, the tracking servo must have relatively high response characteristics to make the convergent spot strictly follow quick fluctuations of the selected track location typical during reproduction conditions. However, when dropouts occur due to defects like dust or scars on a surface of the optical record disc, the tracking actuator mistakingly causes the convergent spot to jump from the correct track location. Because the tracking error information signal becomes large due to the defects so that the tracking actuator drives the objective lens mistakingly in response to the tracking error information signal. Conventional tracking servo systems therefore been designed which lower their response characteristics upon detection of information dropout.

Tracking systems employed to date have several drawbacks, however. The convergent spot is still apt to jump from the selected track location because the tracking actuator fail to vary their response characteristics when defects like dust or scars are of those left inside of the optical record disc during its manufacturing process. Here, as well-known, the optical-disc comprises a transparent disc which bears on its one surface the series of the recesses or the pits and a reflecting film coated on the surface of the transparent disc. The defects are apt to be left inside of the optical record disc, that is, on the recesses or pits bearing surface of the transparent disc during its manufacturing process. The defects outside the surface of the the optical record disc not only cause the tracking error information signal to be increased but also cause the reproduction signal to be reduced to an insufficient level. While the defects inside of the optical record disc cause the tracking error information signal to be increased but cause the reproduction signal to be remained in a relatively sufficient level. Influences on the reproduction signal and the tracking error information signal caused by the defects outside or inside of the optical record disc will be explained in detail after description of preferred embodiments of the present invention.

Therefore, the conventional tracking servo system fails to prevent a malfunction of a track jump caused by the defects left inside of the optical record disc. Because the the information dropout necessary for the control of lowering the response characteristics fails to be detected for the defects left inside of the optical record disc.

It should be apparent to those knowledgeable in the field of scanning beam control systems, and particularly the field of scanning beam tracking systems, that there is a definite need for a system that can detect and compensate for deviations from normal operation of the specified characteristic being controlled. In particular, it should be apparent from the forgoing that a specific need has existed for a tracking system that includes means for detecting and compensating for record medium defects that otherwise can cause a loss of tracking. The present invention fulfills these needs.

SUMMARY OF THE INVENTION

It is, therefore, an object of the present invention to provide an optical record disc information reproducing apparatus perfoming precise tracking control of a convergent spot of laser light beam along a selected track location, even in the event of defects of the optical record disc.

According to the present invention, a tracking control system for an optical disc information reproducing apparatus in which information stored in an optical disc as a series of recesses or pits arranged in concentric tracks or in a single spiral track is read out during rotation of the optical-disc by a scanning spot of a light beam, the system comprising a light source for generating the light beam used for scanning the track, means for applying the scanning spot of the light beam to a selected track location, a transducer for converting an optical signal detected by the scanning spot into an electric signal bearing a tracking error information, means for controlling the scanning spot applying means in response to the tracking error information signal, thereby causing the scanning spot to scan the selected track location accurately, means for transferring the tracking error information signal to the controlling means, a transfer characteristics of the transferring means being variable, means for limiting a slew rate of the tracking error information signal, means for subtracting an output of the slew rate limiting means from the tracking error information signal, and means for lowering the transfer characteristics of the controlling means in response to an output of the subtracting means, thereby causing the controlling means being irresponsive to the tracking error information signal.

Additional objects and advantages of the present invention will be apparent to persons skilled in the art from a study of the following description and the acconpanying drawings, which are hereby incorporated in and constitute a part of this specification.

DESCRIPTION OF THE PREFERRED EMBODIMENTS

Figure 1:
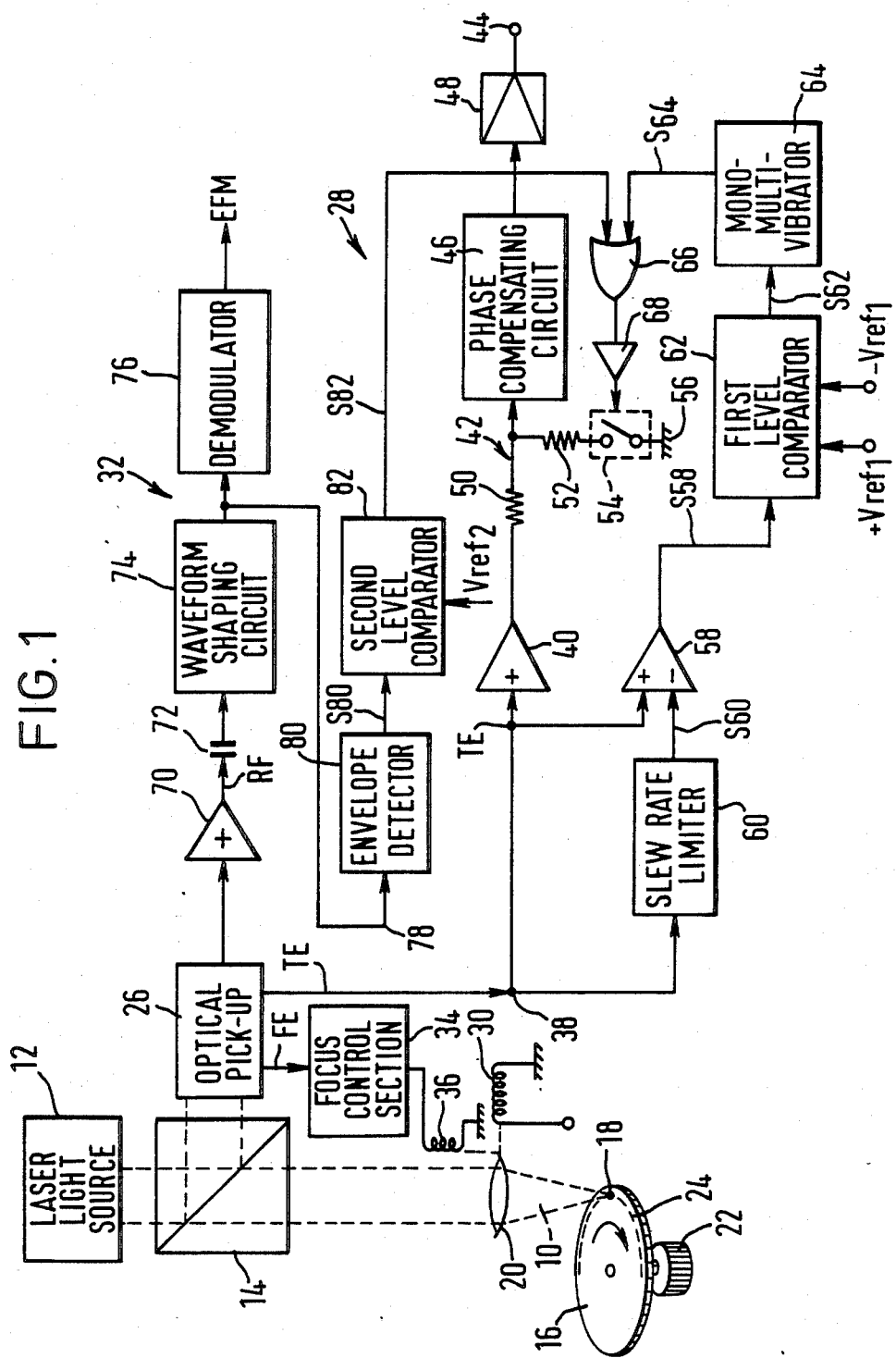
FIG. 1 is a block diagram of a preferred embodiment of an optical record disc information reproducing apparatus according to the present invention.

The present invention will be described in detail with reference to the FIG. 1 to FIG. 5. Throughout drawings, like reference numerals or letters are used to designate like or equivalent elements.

Referring now to FIG. 1, description will be made of a fundamental circuit arrangement of an optical record disc information reproducing apparatus embodying the present invention. In FIG. 1, parts which are not relevant to the control of the apparatus are omitted from the illustration. A light beam 10 emerging from a laser light source (such as a He-Ne laser) 12 is applied through a deflection beam splitter 14 to an optical record disc 16. Beam 10 converges at a point on optical record disc 16, termed the convergent spot 18, by means of an objective lens 20. Optical record disc 16, that is, the DAD or the video disc is rotated at the CLV speed at the DAD player or at the CAV speed at the video disc player via a disc drive motor 22. A single spiral track or a plurality of concentric tracks 24 is provided on optical record disc 16 bearing information relating to audio signals or video signals, etc., which have been recorded in coded form at high density. This optically stored information is read out by scanning the single piral track or the concentric tracks 24 on optical record disc 16 through manipulation of convergent spot 18.

At convergent spot 16 of light beam 10, the information on a selected track location 24 is read in the form of changes in the reflection factor of light beam 10 due to the recesses or pits representing the coded information of the audio or video signal. A reflected light beam (referred as 10 hereafter, too) returns to objective lens 20 and is separated from the entrance beam by deflection beam splitter 14. Reflected light beam 10 is then guided to an optical pickup 26. Optical pickup 26 is of a conventional one which comprises two or four photoelectric transducing elements arranged each other for separately detecting reflecting light beam 10. Optical pickup 26 then generates three signals: audio or video information carrying signal, i.e., so-called an RF (Radio Frequency; means a very high frequency) signal RF, tracking information carrying signal, i.e., tracking error signal TE and focusing information carrying signal, i.e., focusing error signal FE, respectively on its three output terminals via operations of detection signals of the photoelectric transducers.

Tracking error signal TE is applied through a tracking control section 28, which will be described in detail later, to a tracking actuator 30 and is used for a tracking control of light beam 10. RF signal RF is applied to a recorded information reproducing section 32. While focusing error signal FE is applied through a focusing control section 34 to a focusing actuator 36 and is used for a focusing control of light beam 10 in the conventional manner.

In tracking control section 28, tracking error signal TE supplied from optical pickup 26 is applied to a first input terminal 38 of the section 28. Tracking error signal TE is then introduced through an amplifier 40 to a level changing circuit 42. An output of level changing circuit 42 is applied to an output terminal 44 of tracking control section 28 through a phase compensating circuit 46 and a tracking actuator drive amplifier 48. An output of tracking control section 28, i.e., a tracking control signal appearing on output terminal 44 is applied to tracking actuator 30. Level changing circuit 42 comprises a first resistor 50, a second resistor 52 and a switch 54. First resistor 50 is coupled between amplifier 40 and phase compensating circuit 46, while second resistor 52 and switch 54 are coupled in series between an input terminal of phase compensating circuit 46 and a reference potential source or ground potential source 56.

Tracking error signal TE on first input terminal 38 is further applied not only to a subtractor circuit 58 but also to a slew rate limiter circuit 60. An output S60 of slew rate limiter circuit 60 is then applied to subtractor circuit 58. Tracking error signal TE is applied to a noninverting input terminal of subtractor circuit 58, while slew rate limiter output S60 is applied to an inverting input terminal of subtractor circuit 58. An output S58 of subtractor circuit 58 is applied to a first level comparator 62. First level comparator circuit 62 compares subtractor output signal S58 with positive and negative reference levels +Vref1 and −Vref1 so as to produce a first comparator output S62 which is held in a low level L or a high level H in response to whether subtractor output signal S58 being in the range between positive and negative reference levels +Vref1 and −Vref1 or out of the range. First level comparator output S62 is applied to a mono-multivibrator circuit 64. Everytime when an H level first level comparator output signal S62 is applied to mono-multivibrator circuit 64, mono-multivibrator circuit 64 holds its output signal S64 in H level for a predetermined period. Mono-multivibrator circuit 64 applies its output signal S64 through an OR gate 66 and an amplifier 68 to the control terminal of switch 54 in level-changing circuit 42.

In record signal reproducing circuit 32, RF signal RF supplied from optical pickup 26 is applied through an amplifier 70 and a DC current intercepting capacitor 72 to a waveform shaping circuit 74. In waveform shaping circuit 74, RF signal RF is shaped its waveform from a round condition as detected at optical pickup 26 to a rectangular condition close to an original recorded PCM signal. The output of waveform shaping circuit 74 is applied to a demodulator circuit 76 for demodulating an audio or video signal from RF signal RF.

RF signal RF outputted from waveform shaping circuit 74 is further applied to tracking control section 28 through its second input terminal 78. RF signal RF applied to second input terminal 78 of tracking control section 28 is introduced to an envelope detector circuit 80, wherein an envelope of RF signal RF is detected. Envelope signal S80 as detected in envelope detector circuit 80 is applied to a second level comparator circuit 82. Second level comparator circuit 82 compares envelope signal S80 with a second reference level Vref2 so as to produce a second level comparator output S82 which is held in a low level L or a high level H in response to whether envelope signal S80 being higher or lower than second reference level Vref2. Second level comparator output S82 is applied through OR gate 66 and amplifier 68 to the control terminal of switch 54 in level-changing circuit 42. That is, OR gate 66 is applied two signals; mono-multivibrator output S64 and second level comparator output S82 to its two input terminals, respectively.

Therefore, switch 54 is made into a closed state by either H level mono-multivibrator output S64 or H level second level comparator output S82. While switch 54 is held in an open state when both mono-multivibrator output S64 and second level comparator output S82 are L level together.

The operation of the tracking servo control according to the above embodiment will be explained with reference to FIGS. 1, 2 and 3.

Figure 2:
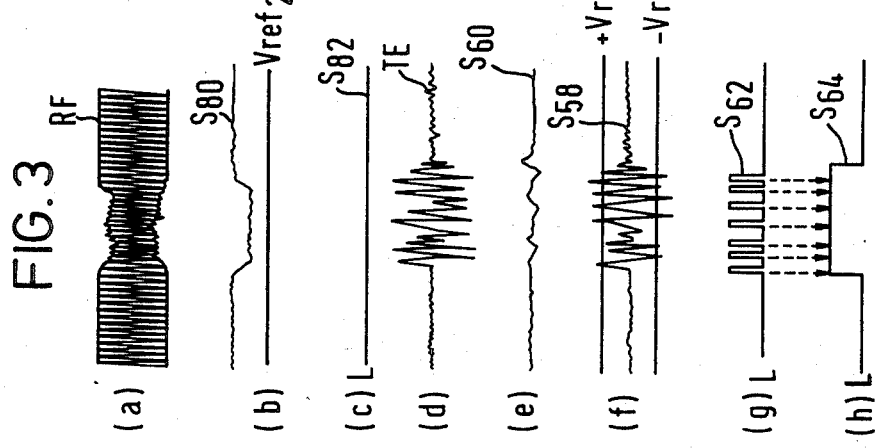
FIG. 2 is a timing diagram showing various waveforms, (a)-(n), appearing in the circuit arrangements of FIG. 1 at a presense of a defect outside of an optical record disc.

FIG. 2 is a timing diagram showing various waveforms of the signals appearing in the circuit arrangement of FIG. 1 when convergent spot 18 scans track 24 damaged by a defect such as dust or a scar on a surface of optical record disc 16. While FIG. 3 is another timing diagram showing various waveforms of the signals differently appearing in the circuit arrangement of FIG. 1 when convergent spot 18 scans track 24 damaged by another kind of defect left inside of optical record disc 16.

In case of FIG. 2, RF signal RF is lost as shown in graph (a) at the tracing track 24 with a defect on the surface of disc 16. At the time, tracking error signal TE as shown in graph (d) appears on the output terminal of optical pickup 26. The signal TE has a positive and a negative peaks at the beginning and finishing portions of the defect, which increase or decrease relatively gently. When tracking error signal TE of graph (d) is applied to tracking actuator 30 through amplifier 40 etc., the positive and negative peaks will cause light beam 10 to jump off the selected track location 24 uncontrollably.

While RF signal RF divided from recorded information reproducing section 32 is detected its envelope in envelope detector circuit 80. Envelope signal S80 as detected is depressed as shown in graph (b) in response to the portion of the defect. Envelope signal S80 is compared with second reference level Vref2 in second level comparator circuit 82 so that second level comparator circuit 82 outputs H level signal S82 as shown in graph (c) in response to the depressed portion of envelope signal S80 beneath second reference level Vref2. H level second level comparator output S82 is applied to the control terminal of switch 54 in level-changing circuit 42 so that switch 54 is brought into the close state. Level-changing circuit 42, therefore, attenuates tracking error signal TE so sufficiently as not to drive tracking actuator 30. As a result, although tracking error signal TE with relatively high amplitude peaks is produced due to the defect on the surface of disc 16, tracking error signal TE is attenuated in level-changing circuit 42 which is rendered in the operation condition by another signal generated due to the defect, i.e, H level second level comparator output S82 from second level comparator circuit 82.

By the way, tracking error signal TE with the high amplitude peaks is also applied to subtractor circuit 58 directly or indirectly through slew-rate limiter circuit 60. Slew-rate limiter circuit 60 limits or depresses a slew-rate of input signals to a lower rate so that sharp waveform components of input signals are strongly depressed in lower amplitudes whereas gentle waveform components are left unchanged. The positive and negative peaks in tracking error signal TE as shown in graph (d) of FIG. 2 are relatively gentle so that slew rate limiter output signal S60 has a waveform closely resembling to that of tracking error signal TE as shown in graph (d). Subtractor circuit 58, therefore, outputs the signal S58 with very low amplitude components as shown in graph (f), as a result of subtraction between tracking error signal TE and slew rate limiter output signal S60 both resembling each other in their waveforms. Subtractor output signal S58 is compared in its level with positive and negative first reference levels +Vref1 and −Vref1 in first level comparator circuit 62. Subtractor output signal S58 fails to exceed the range between positive and negative first reference levels +Vref1 and −Vref1 so that first level comparator output S62 is left unchanged in L level as shown in graph (g). Mono-multibivrator output S64 from mono-multibivrator circuit 64 is also left unchanged in L level as shown in graph (h). Therefore the circuit section consisting of subtractor circuit 58, slew-rate limiter circiut 60, etc fail to prevent the track jump malfunction due to the defect on the surface of disc 16. However, the circuit section consisting of envelope detector circuit 80 and second level comparator circuit 82 is able to prevent the malfunction instead.

Figure 3:
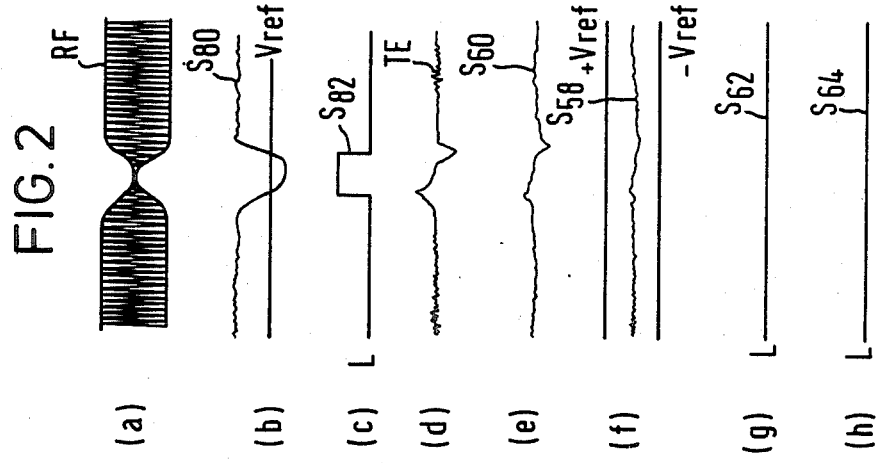
FIG. 3 is another timing diagram showing various waveforms, (a)-(n), appearing in the circuit arrangements of FIG. 1 at a presense of a defect inside of an optical record disc.

In case of FIG. 3, RF signal RF is disturbed and slightly decreased as shown in graph (a) at the tracing track 24 with a defect left inside of disc 16. At the time, tracking error signal TE as shown in graph (d) appears on the output terminal of optical pickup 26. The signal TE has a plurality of very sharp and large amplitude positive and negative peaks in extending over the defect. When tracking error signal TE of graph (d) is applied to tracking actuator 30 through amplifier 40 etc., the very sharp and large amplitude positive and negative peaks will also cause light beam 10 to jump off the selected track location 24 uncontrollably.

While tracking error signal TE with the very sharp and high amplitude peaks is applied to the non-inverting input and inverting input terminals of subtractor circuit 58 directly and indirectly through slew-rate limiter circiut 60. Slew-rate limiter circiut 60 limits or depresses a slew-rate of input signals to a lower rate so that sharp waveform components of input signals are strongly depressed in lower amplitudes whereas gentle waveform components are left unchanged as described before. The large amplitude peak components in tracking error signal TE of FIG. 3 are very sharp as shown in graph (d) so that the large amplitudes are strongly depressed to small amplitude. Slew rate limiter output signal S60 has, therefore, a waveform as shown in graph (e). Subtractor circuit 58 outputs signal S58 with a waveform very alike tracking error signal TE as shown in graph (d), as a result of subtraction between tracking error signal TE and slew rate limiter output signal S60. Subtractor output signal S58 is compared its level with positive and negative first reference levels +Vref1 and −Vref1 in first level comparator circuit 62. Subtractor output signal S58 protrudes from the range between positive and negative first reference levels +Vref1 and −Vref1 at its large amplitude peak portions so that first level comparator output S62 has a plurality of H level pulses as shown in graph (g). Mono-multibivrator output S64 from mono-multibivrator circuit 64 is changed in H level upon a receipt of first H level pulse of first level comparator output S62 and maintained until a predetermined period after the last H level pulse thereof as shown in graph (h).

By the way, RF signal RF divided from recorded information reproducing section 32 is detected by its envelope in envelope detector circuit 80. Envelope signal S80 as detected is slightly depressed as shown in graph (b) in response to the portion of the defect. Envelope signal S80 is compared with second reference level Vref2 in second level comparator circuit 82. Second level comparator circuit 82, however, maintains its output signal S82 in L level as shown in graph (c) because envelope signal S80 including the depressed portion always exceeds second reference level Vref2. Although L level second level comparator output S82 is applied to the control terminal of switch 54 in level-changing circuit 42, switch 54 is left unchaned in the original open state. Level-changing circuit 42, therefore, fails to attenuate tracking error signal TE so as to drive tracking actuator 30.

Therefore the circuit section consisting of envelope detector circuit 80 and second level comparator circuit 82 fails to prevent the track jump malfunction due to the defect left inside of disc 16. However the circuit section consisting of subtractor circuit 58, slew-rate limiter circiut 60, etc is able to prevent the track jump malfunction due to the defect instead.

Figure 4:
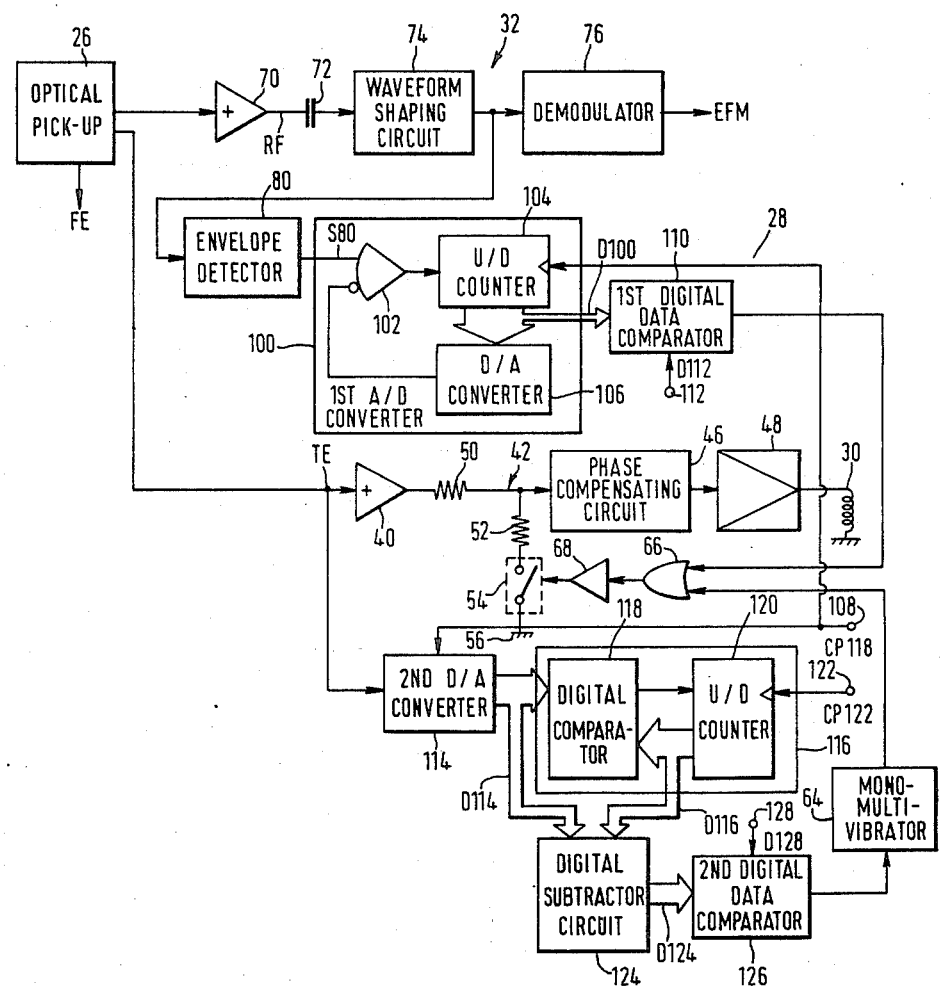
FIG. 4 is a block diagram showing a modification of the circuit arrangement of FIG. 1.

Referring now to FIG. 4, descriptions will be made of a modification of the circuit shown in FIG. 1. The circuit arangement shown in In FIG. 4 is so modified from that of FIG. 1 to process some of the signals for tracking control digitally. While the circuit arrangement shown in FIG. 1 processes the signals analogous. Therefore, the modified portions will be described in detail hereinafter, but the rest portions which are same or identical with those of FIG. 1 will be described as occasion demands.

In FIG. 4, a first analog to digital converter (referred as A/D converter hereinafter) 100 which corresponds to second level comparator circuit 82 in FIG. 1 is prepared for being coupled to envelope detector circuit 80. First A/D converter 100 is comprised of an analog comparator 102, a first up/down counter (referred as U/D counter) 104 and a digital to analog converter (referred as D/A converter hereinafter) 106. Analog comparator 102 is connected its non-inverting input and inverting input to envelope detector circuit 80 and D/A converter 106 and its output to first U/D counter 104. First U/D counter 104 is connected its output port to an input port of D/A converter 106. First U/D counter 104 is further connected its clock input terminal to a first clock signal source 108. The output port of first U/D counter 104 is connected as an output port of first A/D converter 100 to an input port of a first digital data comparator 110. First digital data comparator 110 is connected its output terminal to level-changing circuit 42 through OR gate 66 and amplifier 68, and its reference input terminal to a first slice level data source 112.

On the other hand, a second A/D converter 114 which is constructed similarly to first A/D converter 100, is prepared for being coupled to the tracking error signal output terminal of optical pickup 26. An output port of second A/D converter 114 is connected to a digital slew rate limiter circuit 116 which corresponds to analog slew rate limiter circuit 60 in FIG. 1. Digital slew rate limiter circuit 116 is comprised of a digital comparator circuit 118 and a second U/D counter 120. Digital comparator circuit 118 is connected its two input ports respectively to output ports of second A/D converter 114 and second U/D counter 120, and its output terminal to an input terminal of second U/D counter 120. Second U/D counter 120 is connected its clock input terminal to a second clock signal source 122. The respective output ports of second A/D converter 114 and second U/D counter 120 are further connected to both input ports of digital subtractor circuit 124. An output port of digital subtractor circuit 124 is connected to an input port of second digital data comparator circuit 126. Digital data comparator circuit 126 is connected its output terminal to OR gate 66 through mono-multivibrator 64, and its reference input terminal to a second slice level data source 128.

In the circuit of FIG. 4 as constructed as above, first and second A/D converters 100 and 114 convert an analog envelope signal S80 from envelope dectector circuit 80 and an analog tracking error signal TE from optical pickup 26 to corresponding digital signals D100 and D114 respectively. Digital signal D100 from first A/D converter 100 is compared with a first slice level data D112 from first slice level data source 112, which corresponds to second reference level Vref2 in FIGS. 2 and 3. First digital data comparator 110, therefore, outputs an H level first digital data comparator output D110 when digital signal D100 from first A/D converter 100 is less than first slice level data D112 from first slice level data source 112. H level first digital data comparator output D110 then makes level-changing circuit 42 to attenuate tracking error signal TE which is produced in malfunction according to a defect on the surface of disc 16.

In digital slew rate limiter circuit 116, second U/D counter 120 counts the output from digital comparator circuit 118 under a control of second clock pulse CP122. Where a frequency f122 of second clock pulse CP122 is selected lower than a frequency f108 of first clock pulse CP108 from first clock pulse source 108. First clock pulse CP108 is applied to second A/D converter 114 and first U/D counter 104 in first A/D converter 100. Then, the output of second U/D counter 120, i.e., the output of digital slew rate limiter circuit 116 becomes hard to follow quickly a change of the output D114 from second A/D converter 114.

Therefore, digital slew rate limiter circuit 116 limits a slew rate of an input data therefor so that the input data with a rapid change is altered to a data with a slow change. If second A/D converter 114 outputs its output D114 with a rapid change due to a defect left inside of disc 16, output D116 from digital slew rate limiter circuit 116 has been different from output D114 of second A/D converter 114. Digital subtractor circuit 124, therefore, outputs output D124 close to output D114 of second A/D converter 114. Second digital data comparator 126 outputs H level second digital data comparator output D126 if digital subtractor output D124 is larger than second slice level data D128 due to a defect left inside of disc 16, as a result of comparison therebetween. Mono-multivibrator 64, therefore, makes level-changing circuit 42 to attenuate tracking error signal TE which is produced in malfunction according to a defect left inside of disc 16, in response to H level second digital data comparator output D126.

The circuit as shown in FIG. 4 is able to operate similarly to the circuit shown in FIG. 1, referring to the prevention of track jump mulfunction due to either of defects on the surface or left inside of disc 16. However, the circuit shown in FIG. 4 is more advantageous than the circuit shown in FIG. 1 for fabricating in an integrated circuit, because digital circuits are manufactured with less components, especially with less capacitor devices than analog circuits.

Figure 5:
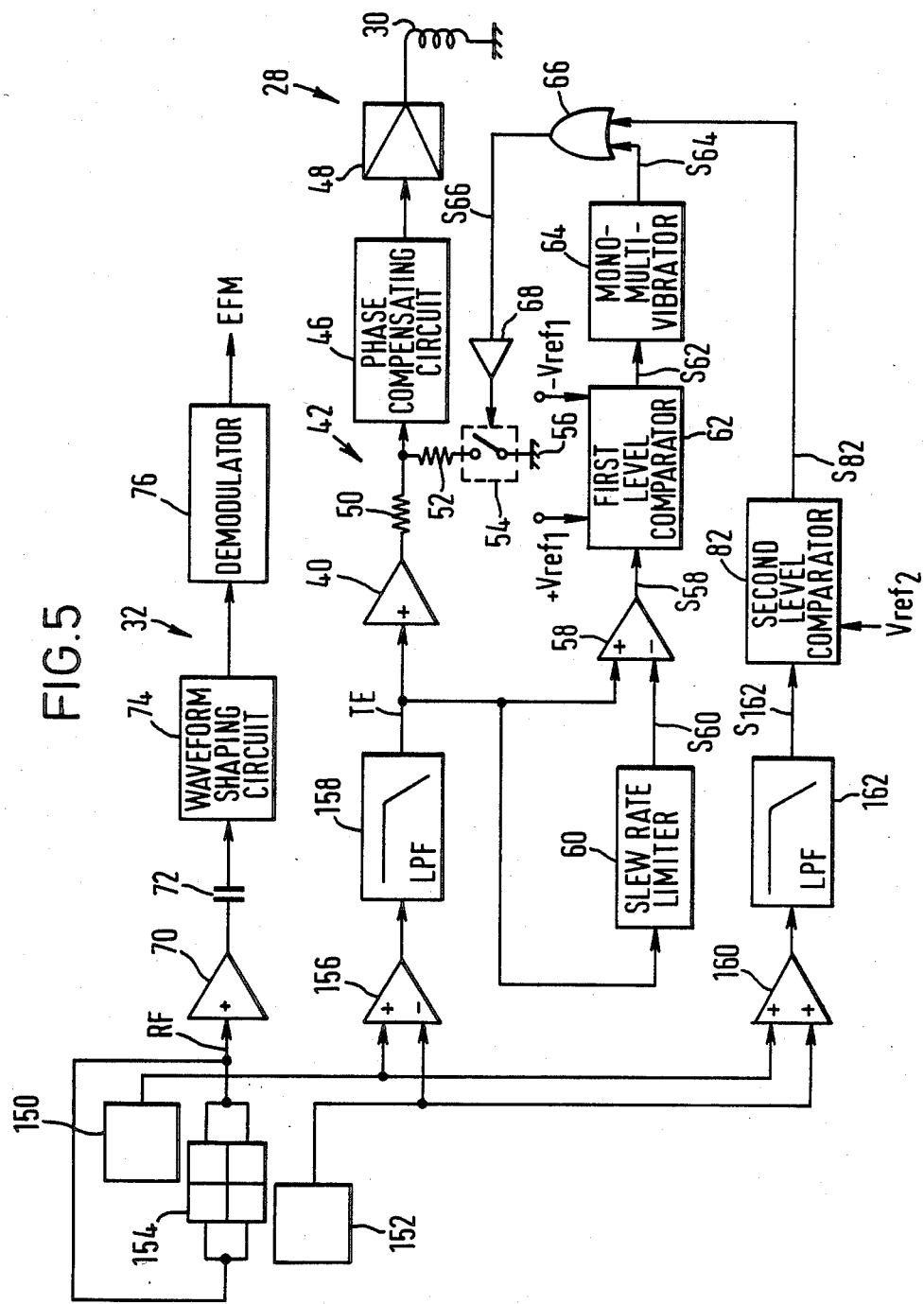
FIG. 5 is a block diagram showing another modification of the circuit arrangement of FIG. 1.

Referring now to FIG. 5, descriptions will be made of another modification of the circuit shown in FIG. 1. The circuit arangement shown in In FIG. 5 is so modified from FIG. 1 that optical pickup 26 is a type of so-called three beam pickup, while pickup 26 in FIG. 1 being so-called a one beam pickup. Three beams type pickup 26 has two sub photodetectors 150 and 152 which are applied respective sub beam for tracking control, other than a main photodetector 154 which is applied a main beam for reading recorded informations on a selected track location 18. Therefore, the modified portions will be described in detail hereinafter, but the remaining portions which are the same or identical with those of FIG. 1 will be described as occasion demands.

In FIG. 5, a second subtractor circuit 156 is prepared for being coupled its respective input terminals to sub photodetectors 150 and 152. An output of second subtractor circuit 156 is changed to a tracking error signal TE after being sent through a first low path filter (referred as LPF hereinafter) 158. Then tracking error signal TE is processed similarly to the circuit shown in FIG. 1.

On the other hand, an adder circuit 160 is prepared for being coupled with its respective input terminals to sub photodetectors 150 and 152. An output of adder circuit 160 is changed to a signal S162 corresponding to envelope signal S80 in FIG. 1 after through a second LPF 162. Therefore, signal S162 is referred as envelope signal S162 hereinafter for the benefit of explanation. Then envelope signal S162 is processed similarly to the circuit shown in FIG. 1.

What is claimed is:

1. A tracking control system for an optical disc information reproducing apparatus in which information stored in an optical disc as a series of recesses or pits arranged in concentric tracks or in a single spiral track is read out during rotation of the optical-disc by a scanning spot of a light beam, said system comprising:
    a light source for generating the light beam used for scanning the track;
    means for applying the scanning spot of the light beam to a selected track location;
    a transducer for converting an optical signal detected by the scanning spot into an electric signal bearing a tracking error information;
    means for controlling said scanning spot applying means in response to the tracking error information signal, thereby causing the scanning spot to scan the selected track location accurately;
    means for transferring the tracking error information signal to said controlling means, a transfer characteristics of said transferring means being variable;
    means for limiting a slew rate of the electric signal;
    means for subtracting an output of said slew rate limiting means from the tracking error information signal; and
    means for lowering the transfer characteristics of said transferring means in response to an output of said subtracting means, thereby causing said controlling means being irresponsive to the tracking error information signal.

2. A tracking control system according to claim 1, further comprising means for detecting a dropout of the information on the selected track location and generating a responsive signal to the dropout of information, and wherein said transfer characteristics lowewring means is responsive to said dropout detecting means.

* * * * *